G. W. HEARTLEY.
WHEEL.
APPLICATION FILED APR. 10, 1908.
934,525.
Patented Sept. 21, 1909.
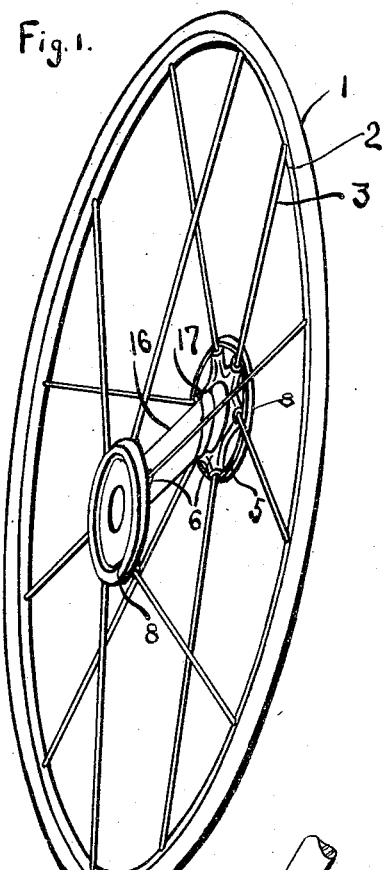
Fig. 1.
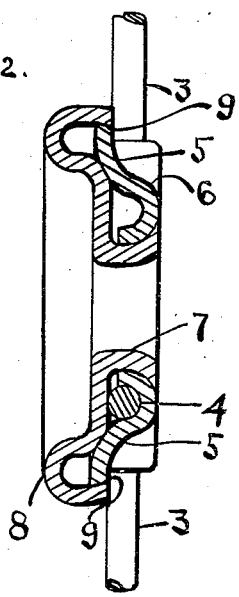
Fig. 2.
Fig. 3.
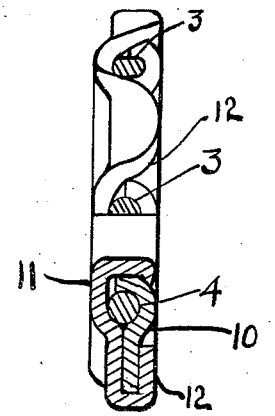
Fig. 6.
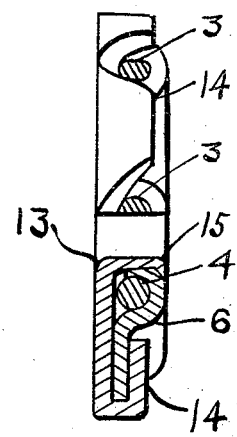
Fig. 7.
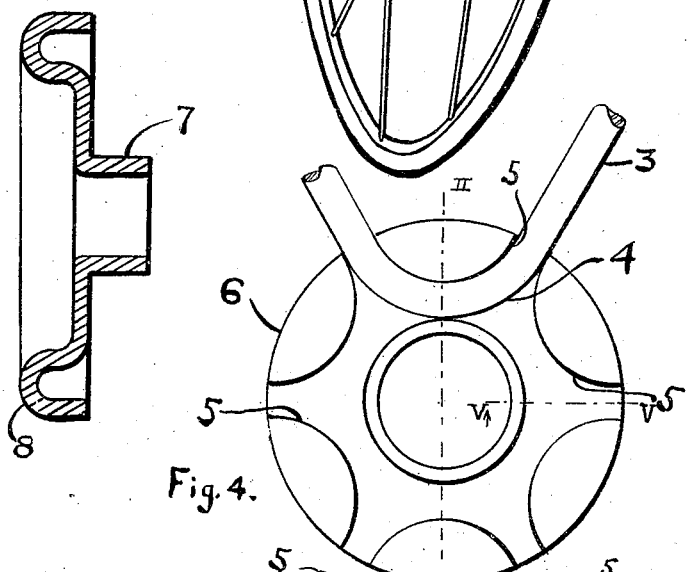
Fig. 4.
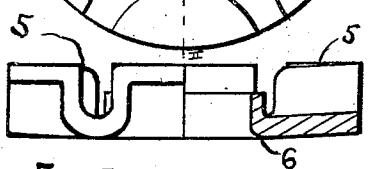
Fig. 5.
WITNESSES
Geo. W. Heartley
INVENTOR
By
ATTORNEY

UNITED STATES PATENT OFFICE.

GEORGE W. HEARTLEY, OF TOLEDO, OHIO.

WHEEL.

934,525.  Specification of Letters Patent.  Patented Sept. 21, 1909.

Application filed April 10, 1908. Serial No. 426,261.

*To all whom it may concern:*

Be it known that I, GEORGE W. HEARTLEY, a citizen of the United States, residing at Toledo, Lucas county, Ohio, have invented a new and useful Wheel, of which the following is a specification.

This invention relates to wheels, and more particularly to the hub construction.

This invention has utility when embodied in metal wheels wherein it has value not only owing to the cheapness of manufacture, but also in holding the spokes firmly as well as producing a hub of neat and finished appearance provided with a guard or sand band.

Referring to the drawings: Figure 1 is a perspective view of an embodiment of the invention in a vehicle wheel; Fig. 2 is a medial section through one of the hub flanges or spoke engaging and holding portions of the hub on line I—I Fig. 4; Fig. 3 is a medial section of the holding or locking element of the hub flange before assembling; Fig. 4 is a side view of the spoke holding or seating element or spider, showing the engagement of a return bend spoke therein; Fig. 5 is an edge view of the spider in half section on the line V—V Fig. 4; Fig. 6 is an edge view in half medial section of a hub flange in which the spoke seats are formed partially in each member, instead of all in one member or element; and Fig. 7 is an edge view in half medial section of a hub flange in which the sand band or guard is omitted.

The wheel illustrated is provided with the rubber tire 1 seated in the crescent rim 2. Radiating dished spokes 3 engage the rim 2. As shown herein the spokes have bends 4 engaging under the projections 5 of the spider or spoke engaging element 6. From Figs. 1 and 5, it is noted that these stamped up projections leave an annular series of cups on the opposite side of member 6, the cups being separated by the ribs or convexities, in the opposite sides of which the grooves or concave portions adjacent the projections form the seats in which the spokes engage. The adjacently similar projections or lugs 5, have their inwardly extending portions convex, and the circular outline of the spider disk approximates chords for these segmental projections 6.

The unnotched disk or opposing member 7, has a portion outwardly bent away from the side facing the spider 6, which bent portion forms the annular rim 8, serving as a guard or sand band, as well as providing a seat for nesting a rubber faced cap or other device to prevent marring of furniture when the wheels are on such vehicles as gocarts. In completing this rim 8 of disk 7, the return side 9, in assembling is clasped or forced inwardly over the outer edges of the cups or projections 5 of the spider 6, dishing to some extent the spider, thereby rendering more effectual the holding, of the spokes against tension, in the seats in the spider. Besides this peripherally engaging of the spider 6 by the return side 9 of the opposing or holding member 7 by overlapping, the tubular extension at the central opening in the disk 7 may be forced outward to annularly engage the central opening in the spider 6 when these central openings are alined in assembling the hub flange.

In Fig. 6, the spider 10 has the spoke holding seats or grooves therein only of a portion of the spoke diameter, the remaining portion of the spokes being seated in the corresponding spider 11 which is assembled in opposing relation to the spider 10. The spider 11 is shown as peripherally notched or provided with tongues or ears 12, which when bent inwardly may clasp the spider 10.

In Fig. 7, the spider 6 is similar to the form in Fig. 1, but the opposing member or disk 13 has no band or rim, while it is provided with the overlapping tongues 14 engaging the spider 6. This notched disk 13, when assembled, has its central opening alined with the central opening of the element 6. As an additional holding means or device for locking the elements of the hub flange assembled, the tubular extension 15 of the disk 13 may be forced outwardly to engage the spider, in a manner similar to the showing in Figs. 2 and 6.

As shown in Fig. 1, the hub flanges for holding the spokes at the hub, may be assembled in pairs on the barrel 16, the distance over which barrel the flanges may be forced being limited in the embodiment herein by the annular rib 17.

The construction is of an exceptionally rigid as well as light wheel which may be rapidly and economically made from wrought metal. The spiders and holding disks cut from sheet metal, are of uniform thickness, light and strong, presenting a pleasing appearance. The elements 6, 7, 10, are stamped or struck from circular blanks, a feature besides meaning considerable economy in cutting the metal as to quantity of metal wasted, embodies a point of considerable value as to initial cheapness of circular die as well as low cost of maintenance, because not of irregular form. With elements 6 and 7 circular, notwithstanding when prepared for use they are shaped up, their edges are concentric. With the spiders 6 and 10, as well as the spider 11, the spoke seat grooves and resulting corresponding projections lie within an unnotched area of the elements. That is, the series of tongues 12 are beyond or without the spoke seating portion of element 11.

The outer edge of the spider is cut on a slight bevel so that as the return side 9 is clasped over or forced against the nearer or longer edge, the elements of the hub flange are drawn more closely together, as shown in Fig. 2.

The spider in combination with its opposing holding element is most effective in locking the spokes, not only laterally, but against tension and thrust, so that the spokes are rigidly held in all ways. Even though in certain structures, either the outer or the inner scheme for holding the sections of the hub flange together may be sufficient; for larger work, or where subjected to severe usage, the two combined as herein shown, produce a most strong device. That is, the tubular central extension may constitute, in smaller work, such as toy cabs, etc., a sufficient holding means when expanded, or the outer holding scheme of clasping inward the flange or ears over the lugs or projections 5, even alternately, may be ample. Instead of showing spokes lying in a single plane, necessitating but one hub flange, the showing herein is of two hub flanges, although the former may be satisfactory or even desirable in many instances. As to the spokes, the essential thing is that there be something at the hub end or portion thereof which may be engaged. Herein instead of showing spokes headed at the hub end, there is shown the return bend type of spokes with which the hub flange interengages.

What is claimed and it is desired to secure by Letters Patent is:

1. A wheel comprising spokes, and holding means for the spokes including a peripherally unnotched disk having a concentric opening and an outwardly bent annular rim concentric with said opening, said rim having a return side coacting to render the holding means effective to retain the spokes in assembled relation.

2. A wheel hub comprising a hub flange having an unnotched disk with a central opening and an outwardly bent annular rim concentric with the opening, said rim having a return side, and an opposing spider having a central opening corresponding to the opening of the disk, said spider having lug portions to form spoke seats, and the unnotched return side of the disk rim being clasped inwardly over said spider.

3. A hub flange comprising a spoke seating spider element, and an opposing disk element, one of which elements has a circular periphery, and the other of which elements has inner and outer engaging means to clasp and hold the elements in assembled relation.

4. A hub comprising an unnotched disk having a central opening and an outwardly bent annular rim concentric with said opening, said rim having a return side, and an opposing element having a corresponding central opening, the unnotched return side of the disk rim being clasped inwardly over said element.

5. A wheel comprising a hub barrel, an unnotched disk having a central opening and an outwardly bent annular rim with a return side concentric with said opening, and an opposing element having a central opening alining with the central opening of the disk and fitting over the hub barrel, the return side of said disk being clasped inwardly over said opposing element.

6. The combination in a wheel of a tubular barrel and return bend spokes of a hub flange including a disk having a central opening and a laterally bent unnotched rim provided with a return side, and an opposing spoke seating element having a central opening alining with the disk opening and fitting over the barrel, the return side of said disk rim being clasped inwardly over said opposing element and binding the spokes in the seats and between the disk and element.

In testimony whereof I affix my signature in the presence of two witnesses.

GEO. W. HEARTLEY.

Witnesses:
H. A. ROBINSON,
GEO. E. KIRK.